Joseph Mihalyi.
Inventor

Patented July 7, 1931

1,813,674

UNITED STATES PATENT OFFICE

JOSEPH MIHALYI, OF ROCHESTER, NEW YORK, ASSIGNOR TO EASTMAN KODAK COMPANY, OF ROCHESTER, NEW YORK, A CORPORATION OF NEW YORK

CAMERA VIEW FINDER CONSTRUCTION

Application filed March 28, 1930. Serial No. 439,695.

My present invention relates to photography, and more particularly to view finders for cameras for the purpose of ascertaining the field of view which will be included in the completed picture.

One object of my invention is to provide a finder more particularly for the folding type of camera, which is compact and accurate, and which is easy to assemble, adjust, repair and clean.

Another object of my invention is to provide a new method of retaining the lenses and reflector in place in a finder.

Another object is to provide a means by which the lenses and reflector of a finder may be clamped into position and held there without damage.

Still another object is to provide a finder having its lenses and reflector and lens mount held in position by a one piece spring clip.

To these and other ends the invention results in certain improvements and combination of parts, all as will be hereinafter fully described, the novel features being pointed out in the claims at the end of the specification.

In the drawings in which like parts are designated by like reference characters throughout: Figure 1 is a cross section of my view finder;

In the present method of constructing a finder difficulty is encountered in the locating and seating of the lenses and mirror as these pieces are generally retained in position by a plurality of bent over lugs or threaded screw caps. These methods are undesirable as the screw caps are expensive to construct, and in bending over the lugs many of the lenses and mirrors are either chipped or cracked, thus requiring replacement.

Figure 1:
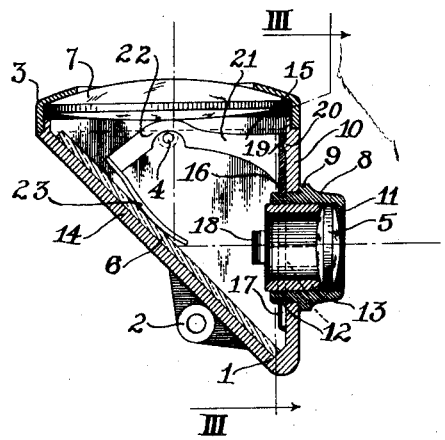

I have disposed of these objections in my invention by employing, as shown in Figure 1, an ordinary finder casing 1, provided with a bracket 2 by which it is hinged to the lens board of a camera, having the usual top piece or cap 3 attached to the casing by screws 4, an objective 5, a mirror 6, and viewing element 7. In the present instance I have shown the viewing element to consist of a positive lens, although of course the well known ground glass viewing element may be used for less expensive finders if desired. The casing 1 is provided with an aperture for an objective or front lens mount 8, said mount having a flange 9 which rests flush against the front wall 10 of the casing, a turned in flange 11 which retains the objective within the mount and a circular groove 12, the function of which will be later described. A sleeve 13 is provided to fit snugly within the lens mount 8 to hold the lens 5 firmly in said mount against the turned in flange 11. The usual mirror 6 is placed on the inclined rear wall 14 of the casing 1, and the viewing element 7 is placed against the formed surface of a cap 3.

Figure 2:
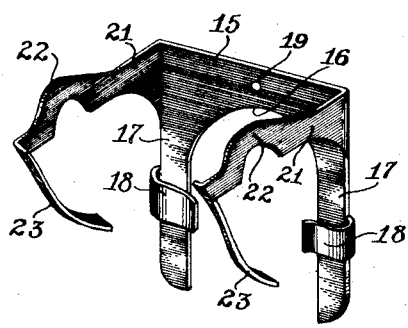
Figure 2 is a perspective of the spring clip which I employ.

To hold the above-described structure in position, I have provided a spring clip 15, clearly shown in Figure 2, formed of one piece of sheet material. The front of this clip forms a yoke 16 having tongues 17 from which extend the fins 18.

Above the yoke 16 is a small aperture 19 which forms a pimple and dimple connection, with the pimple 20 on the rear surface of the front wall 10 of the casing, to retain the clip 15 in position. Extending rearwardly from the side of the front of the clip are the two arms 21 having bow-shaped portions 22 which give a spring to said arms 21. Two springs 23 are bent downwardly from the rear extremities of the arms 21.

Figure 3:
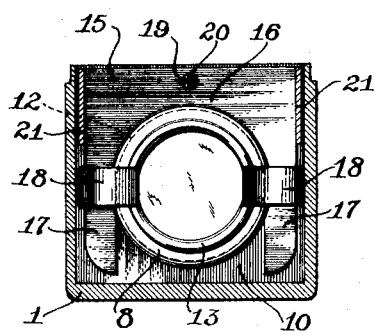
Figure 3 is a section on line III—III of Figure 1.

The operation of the above-described clip 15 is as follows: Upon placing the mirror 6 and the assembled objective mount structure in position, the front wall of the groove 12 coming flush with the rear face of the wall 10, the spring clip 15 is placed in the casing 1 flush against the rear face of the wall 10, the tongues 17 straddling the lens mount 8 and the yoke 16 coinciding with the groove 12, and is pushed down until the dimple 19 and the pimple 20 snap into place, whereupon the yoke 16, fitting in the groove 12, encircles the upper half of the mount 8, as shown in Figure 3, the fins 18 press against the rear end of the sleeve 13 clamping the lens 5 in the mount 8 in position, and the springs 23 press against the mirror 6 (Figure 1) holding it in place. The viewing element 7 and the cap 3 are then placed over the top of the casing, the element 7 resting on the bows 22 of the spring arms 21, and pressed into place, whereupon the screws 4 are inserted, locking the whole structure, the clip 15 holding the objective mount, the objective, the mirror and the viewing element all in place.

It will be noted that a view finder having the general embodiments described above will be extremely easy to manufacture and assemble at a low cost, as the parts are few and simple, the key to the whole structure, namely, the clip 15, may be stamped out of a single piece of sheet material and slid into place.

It is obvious that the embodiments described above are by way of illustration only, and that I contemplate as within the scope of my invention all such forms as may come within the scope of the appended claims.

Having thus described my invention, what I claim as new and desire to secure by Letters Patent is:

1. In a view finder, the combination with a casing, of an objective, a viewing element, and a mirror adapted to bend light rays passing through the objective to the viewing element, means for supporting the objective in the casing including a mount, and a spring clip adapted to support said lens and said viewing element in position relative to the finder casing.

2. In a view finder, the combination with a casing, of an objective, a viewing element, and a mirror adapted to bend light rays passing through the objective to the viewing element, means for supporting the objective in the casing including a mount, and a spring clip adapted to support said lens, viewing element and mirror in position relative to the finder casing.

3. In a view finder, the combination with a casing, of an objective, a viewing element, and a mirror adapted to bend light rays passing through the objective to the viewing element, means for supporting the objective in the casing including a mount, and a spring clip, formed from one piece of sheet material, adapted to support said lens and viewing element in position relative to the finder casing.

4. In a view finder, the combination with a casing, of an objective, a viewing element, and a mirror adapted to bend light rays passing through the objective to the viewing element, means for supporting the objective in the casing including a mount, a spring clip adapted to support said lens and viewing element in position relative to the finder casing, and a snap latch connection between the spring clip and casing for holding said clip in a fixed position relative thereto.

5. In a view finder, the combination with a casing, of an objective, a viewing element, and a mirror adapted to bend light rays passing through the objective to the viewing element, means for supporting the objective in the casing including a mount, and a spring clip adapted to support said lens, viewing element and mount in position relative to the finder casing.

6. In a view finder, the combination with a casing, of an objective, a viewing element, and a mirror adapted to bend light rays passing through the objective to the viewing element, means for supporting the objective in the casing including a mount, and a spring clip adapted to support said lens, viewing element, mount and mirror in position relative to the finder casing.

7. In a view finder, the combination with a casing of an objective, a viewing element, and a mirror adapted to bend light rays passing through the objective to the viewing element, a cap for said casing which is also a seat for said viewing element, means for supporting the objective in the casing including a mount, and a spring clip adapted to support said lens and viewing element in position relative to the finder casing.

8. In a view finder, the combination with a casing, of an objective, a viewing element, and a mirror adapted to bend light rays passing through the objective to the viewing element, means for supporting the objective in the casing including a mount comprising a tubular member flanged at one end and a sleeve adapted to be inserted in the other end, and a spring clip adapted to support the viewing element and the objective, the latter being supported through contact of the spring clip with the tubular member and sleeve supporting the objective.

9. In a view finder, the combination with a casing, of an objective, a viewing element, and a mirror adapted to bend light rays passing through the objective to the viewing element, means for supporting the objective in the casing including a mount comprising a tubular member in which the objective is positioned, flanges on the tubular member adapted to locate the objective and the tubular member, a sleeve adapted to be inserted in said tubular member and a spring clip adapted to support the viewing element and the objective, the latter being supported through contact of the spring clip with the tubular member and sleeve supporting the objective.

10. In a view finder, the combination with a casing, of an objective, a viewing element, and a mirror adapted to bend light rays passing through the objective to the viewing element, a means for seating said viewing element comprising a cap for the casing, means for supporting the objective in the casing including a mount comprising a tubular member flanged at one end and a sleeve adapted to be inserted in the other, and a spring clip formed from one piece of sheet material adapted to support the viewing element, mirror and objective, the latter being supported through contact of the spring clip with the tubular member and sleeve supporting the objective, and a snap latch connection between the spring clip and the casing for holding said clip in a fixed position relative thereto.

Signed at Rochester, New York this 22nd day of March, 1930.

JOSEPH MIHALYI.